(12) United States Patent
Watson et al.

(10) Patent No.: US 7,943,095 B2
(45) Date of Patent: May 17, 2011

(54) PURIFIER

(75) Inventors: Jeremy Daniel McKendrick Watson, Worthing (GB); Robert Bruce Grant, Steyning (GB)

(73) Assignee: Edwards Limited, Crawley, West Sussex (GB)

( * ) Notice: Subject to any disclaimer, the term of this patent is extended or adjusted under 35 U.S.C. 154(b) by 1090 days.

(21) Appl. No.: 10/567,817

(22) PCT Filed: Aug. 6, 2004

(86) PCT No.: PCT/GB2004/003418
§ 371 (c)(1),
(2), (4) Date: Feb. 8, 2006

(87) PCT Pub. No.: WO2005/016492
PCT Pub. Date: Feb. 24, 2005

(65) Prior Publication Data
US 2006/0228272 A1    Oct. 12, 2006

(30) Foreign Application Priority Data
Aug. 15, 2003  (GB) .................... 0319171.5

(51) Int. Cl.
*B01D 50/00* (2006.01)
*B01D 53/34* (2006.01)
(52) U.S. Cl. ........................................ 422/169; 422/177
(58) Field of Classification Search .......... 422/177, 422/159, 169, 213; 423/447.1
See application file for complete search history.

(56) References Cited

U.S. PATENT DOCUMENTS

| | | | | |
|---|---|---|---|---|
| 3,167,678 A * | 1/1965 | Griessel | ............ | 313/554 |
| 3,399,052 A * | 8/1968 | Bobo | ............ | 75/345 |
| 3,593,495 A * | 7/1971 | Ellison | ............ | 95/106 |
| 3,620,645 A * | 11/1971 | Paolo della Porta et al. | . | 428/553 |
| 4,137,012 A * | 1/1979 | della Porta et al. | ............ | 417/51 |
| 4,942,019 A * | 7/1990 | Goodell et al. | ............ | 422/169 |
| 5,154,582 A * | 10/1992 | Danielson | ............ | 417/51 |
| 5,161,955 A * | 11/1992 | Danielson et al. | ............ | 417/51 |
| 5,308,533 A | 5/1994 | Hotaling et al. | | |
| 5,895,519 A | 4/1999 | Lorimer | | |
| 5,911,560 A * | 6/1999 | Krueger et al. | ............ | 417/48 |
| 6,013,195 A * | 1/2000 | Corazza et al. | ............ | 252/181.1 |
| 6,506,319 B1* | 1/2003 | Corazza et al. | ............ | 252/181.6 |
| 6,514,430 B1* | 2/2003 | Corazza et al. | ............ | 252/181.1 |
| 2002/0051712 A1* | 5/2002 | Deninger et al. | ............ | 417/53 |
| 2003/0038082 A1 | 2/2003 | Vergani et al. | | |

FOREIGN PATENT DOCUMENTS

| | | |
|---|---|---|
| EP | 0 255 965 B2 | 2/1988 |
| GB | 1 086 489 A | 10/1967 |
| GB | 1 140 798 A | 1/1969 |
| WO | WO 98/48168 A2 | 10/1998 |

OTHER PUBLICATIONS

United Kingdom Search Report of Application No. GB 0319171.5; Date of search: Feb. 20, 2004.

(Continued)

*Primary Examiner* — Walter D Griffin
*Assistant Examiner* — Natasha Young

(57) ABSTRACT

A purifier is described for use in a gas processing application. The purifier comprises a chamber having a gas inlet and a gas outlet. A series of baffles are arranged in the chamber and coated with a getter material selected for its ability to react with species to be removed from a gas stream and form stable compounds. The chamber also houses a source of the getter material, which is periodically activated to refresh the coating of getter material on the baffles.

22 Claims, 2 Drawing Sheets

OTHER PUBLICATIONS

PCT International Search Report of International Application No. PCT/GB2004/003418; Date of mailing of the International Search Report: Nov. 2, 2004.

PCT Written Opinion of the International Searching Authority of International Application No. PCT/GB2004/003418; Date of mailing: Nov. 2, 2004.

* cited by examiner

PURIFIER

FIELD OF THE INVENTION

This invention relates to purifiers also known as "getters" often used in gas processing applications to remove low levels of impurity or low partial pressures of contaminate species from a buffer gas. Such devices are commonly used in the manufacture of semiconductors to maintain a clean environment in which the product is manufactured.

BACKGROUND OF THE INVENTION

Semiconductor device manufacturing methods commonly result in a toxic waste gas stream from an evacuated process chamber in which the processing takes place. The waste gas stream is evacuated from the chamber by means of one or more vacuum pumps but the gas stream must generally thereafter be treated to reduce or eliminate the toxicity associated with the component species in the stream.

Semiconductor processing involving ion-implantation is commonly employed and utilises hazardous species including phosphine ($PH_3$), arsine ($AsH_3$) and boron trifluoride ($BF_3$). Such an implantation method may use a secondary vacuum pump, for example a cryopump or a turbomolecular pump, to create a working pressure in the chamber of about $1 \times 10^{-4}$ to $1 \times 10^{-5}$ mbar, with a primary pump usually employed to back the secondary pump down to less than 1 mbar.

It is also well known to employ purifiers comprising a chemically active "getter" material which forms stable compounds with the species being pumped, thereby removing contaminate or dangerous species. Such purifiers have hitherto been commonly used in sorption pumps.

The most common getter material is titanium, which may be activated to provide a clean, active surface for reaction with the gas species. This can be effected by sublimation of the titanium by heating (for example resistance heating) to form a vapour of the titanium and the subsequent formation of the deposited "active" titanium surface by condensation of the titanium vapour.

Within ultra-high purity (UHP) gas processing applications, purifiers such as those previously described are often used to remove low levels of impurity, for example below 10's ppm, from the process environment. In certain vacuum processing applications, for example physical vapour deposition (PVD), these purifiers are also used to remove low partial pressures, for example below $10^{-2}$ mbar, of contaminate species. However, the problem with this approach is that the purifier has a finite capacity and while the units are sized to give an acceptable lifetime under normal operation, during fault conditions they may rapidly reach this limit and cease operation. Such purifiers also have a relatively low capacity to size ratio, so that a large getter/purifier is required to achieve a high capacity, or long life.

Furthermore, there are certain UHP gas and vacuum processing applications which generate exhaust streams comprising of an inert buffer gas with low levels of active contaminates. Examples include Xe in EUV (extreme ultra violet) applications, Ar in PVD applications and $N_2/Ar$ in ALCVD (atomic layer chemical vapour deposition) applications. In these applications the gas is often vented to the house scrubber or a POU (point of use) exhaust system.

The invention relates to a purifier that can provide a high capacity in a compact assembly, can tolerate fault conditions and has application in a wide range of gas processing applications.

BRIEF SUMMARY OF THE INVENTION

The present invention provides a purifier for use in a gas processing application, the purifier comprising a chamber having a gas inlet and a gas outlet, a series of baffles arranged in the chamber and coated with a getter material selected for its ability to react with species to be removed from a gas stream and form stable compounds, a source of the getter material provided within the chamber, and means for activating the source to refresh the coating of getter material on the baffles.

BRIEF DESCRIPTION OF THE DRAWINGS

Preferred features of the present invention will now be described, by way of example of, with reference to the accompanying figures, in which.

DETAILED DESCRIPTION OF THE INVENTION

Figure 1:
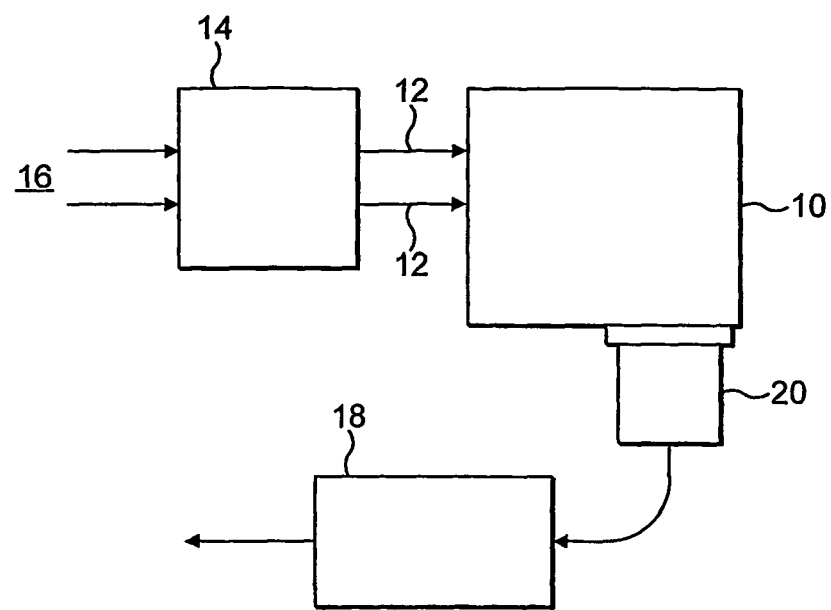
FIG. 1 is a schematic representation of a semiconductor processing system incorporating a sorption pumping the exhaust together with an in-line gas purifier.

FIG. 1 illustrates a semiconductor processing system comprising a process chamber 10 in which devices are manufactured under vacuum conditions. The chamber 10 comprises one or more inlets 12 each for receiving a stream of process gas. A first purifier 14 is located between the inlets 12 and a source of the process gas streams, indicated generally at 16, for purifying the process gas stream prior to entry of these streams into the process chamber 10. The chamber 10 is evacuated by a primary vacuum pump 18. A second purifier 20 is located between the process chamber 10 and the vacuum pump 18, and acts as a secondary vacuum or sorption pump.

Figure 2:
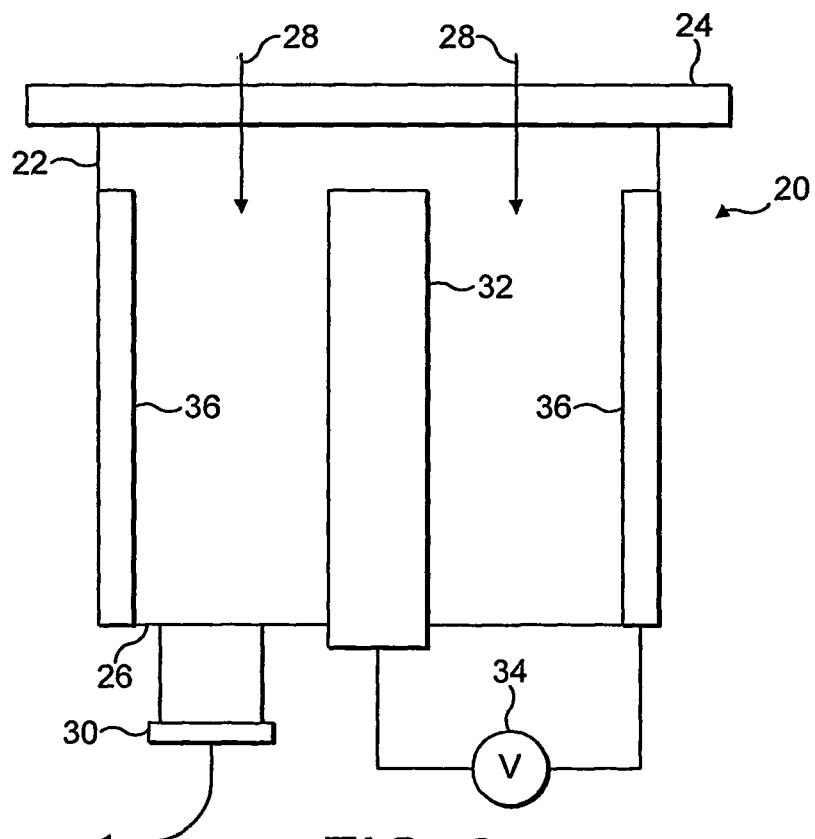
FIG. 2 is an enlarged sectional view through the sorption pump of FIG. 1.

The second purifier 20 is shown in more detail in FIG. 2. The purifier 20 comprises a cylindrical housing 22, a top plate 24 and a bottom plate 26 securely attached to the housing 22, one or more inlets, indicated generally at 28, provided in the top plate 24 and connected to the chamber 10, and an outlet 30 provided in the bottom plate 26 connected to the primary pump 18. Also positioned in the bottom plate 26 is a source of titanium getter material in the form of a rod 32, the purifier 20 being provided with means, indicated generally at 34, for applying an electric potential between the rod 32 and the housing 22. All of the components of the purifier 20 are sealed to form a vacuum-tight environment within the housing 22.

In use of the purifier 20 within the system shown in FIG. 1, an exhaust gas stream is evacuated from the chamber 10 primarily by means of the primary pump 18. With vacuum conditions inside the purifier 20, an electric potential is effected between the rod 32 and the housing 22 so that an arc plasma discharge is introduced in to the housing 22 such that molecules/atoms of the species in the exhaust gas stream from the chamber 10 may be broken down and/or ionised and thereby caused to react more readily with the titanium vapour present in the housing. A deposition 36 of titanium and titanium compounds formed by reaction between the titanium and the exhaust gas species takes place on the internal surface of the housing 22, as shown in FIG. 2.

The purifier 20 may be used to good effect to pump phosphine, arsine and boron trifluoride species.

In an alternative embodiment to that shown in FIGS. 1 and 2, the primary pump 18 is employed to evacuate the chamber 10 but is thereafter disconnected from the system (by valving) and the purifier 20 is then connected to the chamber 10 (again by valving) with the outlet 28 either being absent or sealed. In this embodiment, the purifier 20 operates to pump the semiconductor species without the assistance of a primary pump 18 and can generally pump large quantities of such species by means of the greater pumping efficiencies afforded by the purifier.

Figure 3:
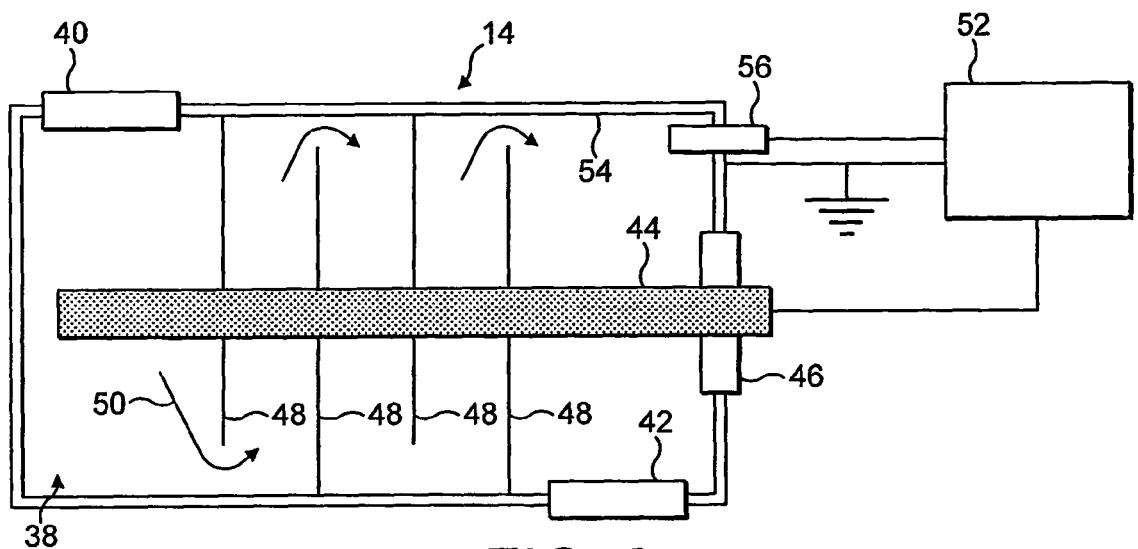
FIG. 3 illustrates an embodiment of the in-line gas purifier of FIG. 1.
Figure 4:
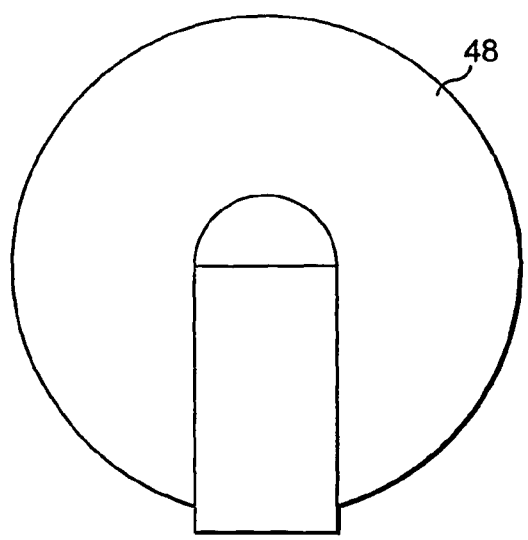
FIG. 4 illustrates a cross-sectional view of a baffle of the purifier of FIG. 3.

The first purifier 14 will now be described with reference to FIGS. 3 and 4.

The purifier 14 comprises a chamber 38 having a gas inlet flange 40 and gas exhaust flange 42. An electrode 44 in the form of a rod extends longitudinally through and substantially co-axial with the chamber 38, the electrode 44 being electrically insulated from chamber 38 by the insulating feedthrough 46. The electrode 44 comprises a specifically selected getter material capable of reacting with contaminate species in a gas to be passed through the chamber 38. Arranged about the electrode 44 and along the length of the chamber 38 is a plurality of horse-shoe shaped baffle plates 48. The baffle plates 48 are shaped and arranged so as to provide a convoluted path, indicated generally at 50, between the inlet 40 and outlet 42 along which gas passing through the purifier 14 is forced to flow.

In use, power supply 52 generates an electric arc across the chamber 38 between electrode 44 and the inner wall 54 of chamber 38, which acts as a collector. This results in arc evaporation of the getter material from the electrode 44. The evaporated electrode material forms a coating of getter material on the surfaces of the baffles 48 and the inner wall 54 of the chamber 38. Once deposition of the electrode material is complete, the gas to be purified is passed through the chamber 38. As the gas passes over the coated baffles 48, active (e.g. contaminate) species are removed by reaction with the getter material. The buffer gas does not react and emerges from the chamber 38 substantially free of contaminates.

When required, either by detection of contaminant species by the optional sensor 56 or at a set time interval, the power supply 52 initiates the striking of another electric arc across the chamber 38, resulting in the release of additional getter material, which coats the baffles 48 and the inner wall 54 of the chamber 38. Reaction products already present on the surface of the existing coating of getter material are encased by the fresh coating of getter material, which provides a fresh active layer of getter material for cleaning further streams of gas.

In use the getter material source is activated so as to produce an electric evaporation of the getter material, for example, by an electric arc struck within the chamber causing arc evaporation, which then coats the series of baffles. The gas to be purified (the buffer gas) enters the chamber and flows over the baffles. The contaminate species are selectively removed by reaction with the getter material to form stable compounds. The inert buffer gas does not react with the getter material and so is simply cleansed of contaminate species as it passes through the purifier.

If the buffer gas is a noble gas then very reactive getter materials can be used, for example Ti, Ta, Zr and alloys thereof. However, if the buffer gas is more reactive, for example, $N_2$, then other materials which do not react with $N_2$ need to be used, such as Fe, Cr and alloys thereof. In addition, the getter material may be selected to maximise the pumping/capture of particular contaminant species.

Once the active layer of getter material has formed a stable compound with the contaminate species on the surface of the baffles and is saturated, a new layer of active material can be deposited simply by evaporating more getter material (for example by striking another arc in the chamber). The new active layer sits on top of the layer of stable compound, thereby permanently removing it from the gas wetted parts of the system.

Periodic renewal of the active layer could be triggered manually or, more conveniently automatically, for example by a time event or by a suitable sensor either within the chamber or at the outlet of the chamber.

The arrangement of baffles is desirably configured so as to provide a convoluted path through which the gas must pass, such that there is available as great a surface area as possible of active material with which contaminate species within the buffer gas may react. By careful manipulation of the baffle arrangement, any short cuts in the gas path are minimised thereby encouraging the gas to take the most convoluted route through the device. The surface area and baffle geometry required for optimum purification will depend on pressure and gas throughput.

In preferred embodiments, the getter material source is a rod (or rods) of the getter material which is surrounded by a collector, for example of cylindrical shape and made of metal which is inert in the gaseous environment to be purified, on to the (or an) inner surface of which the getter material can be deposited from the source.

In such embodiments, an electric potential is maintained between the source of getter material and the collector so that a metallic plasma is formed. This will—generally require an initial high electric potential to form the plasma but a much lower electric potential thereafter. In particular, it is advantageous for there to be created a thermal equilibrium plasma which is maintained at high temperatures. As such, the vaporisation of the getter material is generally effected by arc means.

The electric potential may be continuous or pulsed. Relatively low values may be used, for example 100V after steady state plasma conditions have been effected.

The invention is particularly advantageous in that it permits the generation of a fresh film of active getter material in situ. This avoids the need for interrupting the manufacturing process to take a spent purifier off-line for regeneration or replacement of the active getter material as is necessary with purifiers known from the prior art.

A useful application of the invention is to condition gases entering a process chamber used for the manufacture of semiconductor products, or gases exiting the chamber before these gases enter a vacuum pump used to maintain the desired process environment pressure. The invention may also be applied to remove hydrocarbon impurities from a xenon recirculation system.

A specific basis of the invention is that it has been surprisingly discovered that these purifiers can be used to good effect to treat semiconductor waste species, for example by disassociation or other reaction, and to be entrapped in the deposited material.

The purifier will therefore allow the active getter material created therein to disassociate (or otherwise ionise) the species being conveyed to or from the process chamber and thereafter to react it and cause its entrapment. This is generally achieved in a much more efficient manner than with known purification systems.

The purifier may be embodied in a sorption pump, such a pump comprises a vacuum tight pumping envelope (or housing) having an inlet and outlet, a getter material source located in the envelope and a getter surface on the interior of the collector.

We claim:

1. A purifier for use in a gas processing application comprising:
   a chamber having a gas inlet and a gas outlet;
   at least one baffle arranged in the chamber and having a coating comprising a getter material to react with species to be removed from a gas stream and form stable compounds;
   a source of the getter material within the chamber; and
   means for vaporizing the source of the getter material to refresh the coating of getter material on the at least one baffle.

2. The purifier according to claim 1 further comprising a collector wherein the means for vaporizing the source of the getter material is arranged to produce an electric arc between the source of the getter material and the collector.

3. The purifier according to claim 2 wherein the collector extends about the source of the getter material.

4. The purifier according to claim 2 further comprising an inner wall of the chamber wherein the collector comprises at least part of the inner wall of the chamber.

5. The purifier according to claim 1 wherein the source of the getter material comprises a rod, the at least one baffle being arranged about the rod.

6. The purifier according to claim 5 wherein the rod extends longitudinally through the chamber.

7. The purifier according to claim 6 wherein the rod is substantially co-axial with the chamber.

8. The purifier according to claim 1 wherein the means for vaporizing the source of the getter material comprises a controller.

9. The purifier according to claim 8 wherein the controller is adapted to activate at predefined time intervals.

10. The purifier according to claim 9 further comprising a sensor for monitoring a process wherein the source of the getter material is vaporized when a predefined change in the process gas is detected by the sensor.

11. The purifier according to claim 10 wherein the sensor is located within the chamber.

12. The purifier according to claim 1 wherein the at least one baffle is adapted to create a convoluted path for gas flowing through the chamber.

13. The purifier according to claim 1 wherein the getter material comprises at least one metal selected from the group of metals consisting of Ti, Ta and alloys thereof.

14. The purifier according to claim 1 wherein the getter material comprises at least one metal selected from the group of metals consisting of Fe Cr and alloys thereof.

15. A semiconductor processing system comprising:
   a process chamber having a purified gas inlet; and
   a purifier comprising:
      a housing;
      a gas inlet;
      a gas outlet upstream of the purified gas inlet;
      at least one baffle arranged within the housing and comprising a getter material;
      a source of the getter material; and
      means for applying an electric potential across the source of the getter material and the housing, thereby vaporizing the source of the getter material to refresh the coating of getter material on the at least one baffle.

16. The semiconductor processing system of claim 15 wherein the source of the getter material is a rod.

17. The semiconductor processing system of claim 15 wherein the source of the getter material is an electrode.

18. The semiconductor processing system of claim 15 wherein the at least one baffle is arranged to form a convoluted flow path.

19. The semiconductor processing system of claim 18 wherein at least one baffle is arranged about the source of the getter material.

20. The semiconductor processing system of claim 15 wherein the means for applying an electric potential comprises a power supply.

21. The semiconductor processing system of claim 15 wherein the means for applying an electric potential comprises a controller for activating the source of the getter material at predefined time intervals.

22. The semiconductor processing system of claim 15 wherein the getter material comprises at least one metal selected from the group of metals consisting of Ti, Ta, Zr, Fe, Cr and alloys thereof.

* * * * *